(12) United States Patent
Sakekar et al.

(10) Patent No.: US 9,422,864 B2
(45) Date of Patent: Aug. 23, 2016

(54) STAGGERED DOUBLE ROW, SLOTTED AIRFOIL DESIGN FOR GAS TURBINE EXHAUST FRAME

(71) Applicant: General Electric Company, Schenectady, NY (US)

(72) Inventors: Kunal Upendra Sakekar, Maharashtra (IN); Moorthi Subramaniyan, Karnataka (IN); Srinivasarao Pakkala, Andrhra Pradesh (IN)

(73) Assignee: General Electric Company, Schenectady, NY (US)

( * ) Notice: Subject to any disclaimer, the term of this patent is extended or adjusted under 35 U.S.C. 154(b) by 756 days.

(21) Appl. No.: 13/723,047

(22) Filed: Dec. 20, 2012

(65) Prior Publication Data

US 2014/0178187 A1 Jun. 26, 2014

(51) Int. Cl.
*F01D 9/02* (2006.01)
*F02C 7/00* (2006.01)
*F01D 9/04* (2006.01)
*F01D 5/14* (2006.01)
*F01D 25/30* (2006.01)

(52) U.S. Cl.
CPC . *F02C 7/00* (2013.01); *F01D 5/145* (2013.01); *F01D 5/146* (2013.01); *F01D 9/041* (2013.01); *F01D 25/30* (2013.01); *F05D 2240/12* (2013.01)

(58) Field of Classification Search
CPC ........... F01D 9/04; F01D 9/041; F01D 5/146; F01D 25/30; F05D 2240/12; F05D 2240/129; F05D 2250/34
See application file for complete search history.

(56) References Cited

U.S. PATENT DOCUMENTS

| | | | | |
|---|---|---|---|---|
| 2,844,001 A | * | 7/1958 | Alford | F01D 5/145 138/40 |
| 3,617,147 A | * | 11/1971 | Bragg | F02K 3/06 244/53 B |
| 4,023,350 A | * | 5/1977 | Hovan | F01D 5/145 415/208.2 |
| 5,152,661 A | * | 10/1992 | Sheets | F01D 5/145 415/206 |
| 5,284,011 A | | 2/1994 | Von Benken | |
| 5,562,419 A | | 10/1996 | Crall et al. | |
| 5,851,105 A | | 12/1998 | Fric et al. | |
| 6,715,983 B2 | * | 4/2004 | Koshoffer | F01D 5/146 415/1 |
| 7,100,358 B2 | | 9/2006 | Gekht et al. | |
| 8,061,983 B1 | | 11/2011 | Bowers et al. | |
| 2011/0052373 A1 | | 3/2011 | Sparks | |

FOREIGN PATENT DOCUMENTS

| | | |
|---|---|---|
| EP | 1505263 A1 | 2/2005 |
| GB | 739935 A | 11/1955 |
| WO | 2008060195 A1 | 5/2008 |

OTHER PUBLICATIONS

EP Search Report and Written Opinion dated Mar. 12, 2014 issued in connection with corresponding EP Application No. 13196876.0.

* cited by examiner

*Primary Examiner* — Ninh H Nguyen
(74) *Attorney, Agent, or Firm* — Nixon & Vanderhye P.C.

(57) ABSTRACT

A gas turbine exhaust frame includes an inner barrel and an outer barrel establishing an annular exhaust gas flow path therebetween. A plurality of airfoils extend radially between the inner barrel and the radially, outer barrel, the plurality of struts arranged in first and second axially-spaced and circumferentially-staggered rows.

14 Claims, 5 Drawing Sheets

STAGGERED DOUBLE ROW, SLOTTED AIRFOIL DESIGN FOR GAS TURBINE EXHAUST FRAME

BACKGROUND OF THE INVENTION

The present invention relates generally to gas turbine technology and, more specifically, to the design of a gas turbine diffuser exhaust frame.

A gas turbine engine is conventionally configured to receive ambient air and to discharge exhaust or combustion gases into an annular diffuser. The combustion gases are then discharged to atmosphere through a conventional exhaust stack.

The engine may take any conventional form including single or dual rotor engines, with one or more compressors, followed in turn by a combustor, (or an annular array of combustors) in which compressed air is mixed with fuel and ignited for generating the combustion or exhaust gases. Disposed downstream of the one or more combustors are one or more turbine stages which extract energy from the exhaust gases for powering the engine as well as typically providing output power through an output shaft for a load such as a generator.

The diffuser or exhaust frame typically includes an annular frame having an inner annular wall spaced radially inwardly from an outer annular wall or casing which define radially therebetween an annular flow channel for channeling the combustion gases to the diffuser and exhaust stack. The frame also typically includes a plurality of circumferentially-spaced and aligned, radially-extending struts disposed between the inner and outer annular casings.

In current gas turbine exhaust frame designs, a single row of rectangular struts are used to transfer loads from the inner to the outer annular members. The shape of each strut, and its cross-sectional area, are governed by the shape of an airfoil that surrounds the strut, and the total load to be transferred. In this type of configuration, the airfoils are relatively long, thereby producing larger losses, especially during part-load operating conditions.

It would therefore be desirable to have a strut/airfoil arrangement which enables smaller cross-sectional areas, and which produces smaller performance losses especially at part-load conditions.

BRIEF SUMMARY OF THE INVENTION

In one exemplary but nonlimiting embodiment, the invention provides a gas turbine exhaust frame comprising an inner substantially cylindrical wall; an outer substantially cylindrical wall establishing an annular exhaust gas flow path therebetween; and a plurality of airfoils extending radially between the inner wall and the outer wall, the plurality of airfoils arranged in first and second axially-spaced, circumferentially-staggered rows.

In another exemplary aspect, the invention provides a gas turbine exhaust diffuser comprising a frame having an inner substantially cylindrical wall and an outer substantially cylindrical wall defining an annular exhaust gas flow channel; and a plurality of airfoils extending between the inner and outer walls, the plurality of airfoils arranged in first and second axially-spaced, circumferentially-staggered rows, wherein the first and second axially-spaced, circumferentially-staggered rows at least partially overlap in an axial direction.

In still another aspect the invention a gas turbine exhaust diffuser comprising a frame having an inner substantially cylindrical wall and an outer substantially cylindrical wall defining an annular exhaust gas flow channel; a plurality of airfoils extending between the inner and outer walls, the plurality of airfoils arranged in first and second annular, axially-spaced and circumferentially-staggered rows; each of the plurality of airfoils having a leading edge and a trailing edge and a slot extending radially along and adjacent at least a portion of the leading edge, the slot having an inlet on one side of the airfoil extending angularly in a downstream direction to an outlet on an opposite side of the airfoil.

The invention will now be described in greater detail in connection with the drawings identified below.

DETAILED DESCRIPTION OF THE INVENTION

Figure 1:
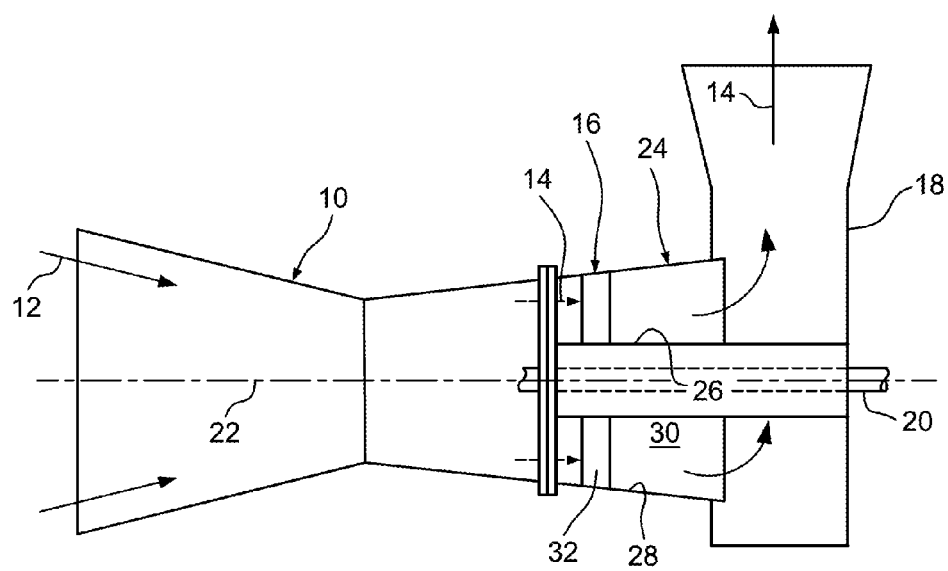
FIG. 1 is a schematic representation of a conventional gas turbine engine.

Illustrated schematically in FIG. 1 is an exemplary industrial gas turbine engine 10 which is configured for receiving ambient air 12 and discharging exhaust or combustion gases 14 into an annular diffuser 16 in conventional fashion. The gases are then discharged to atmosphere through a conventional exhaust assembly or stack 18.

Typically, the engine 10 may be a single or dual rotor engine, with one or more compressors and a combustor (not shown) in which compressed air is mixed with fuel and ignited for generating the combustion or exhaust gases 14. Disposed downstream of the combustor(s) are one or more turbine stages (not shown) which extract energy from the exhaust gases 14 for powering the engine 10 as well as for providing output power through an output shaft 20. The engine 10 and the diffuser 16 are typically axis-symmetrical about a centerline axis 22.

The diffuser 16 illustrated in FIG. 1 includes at its upstream end an annular frame 24 having an annular inner wall or barrel 26 spaced radially inwardly from an annular outer wall or casing 28, thus establishing an annular exhaust gas flow channel 30.

The inner wall 26 and the outer wall 28 are substantially cylindrical bodies, and it will be understood that the outer wall or casing 28 may taper along its length, typically outwardly in the direction of exhaust gas flow.

Figure 2:
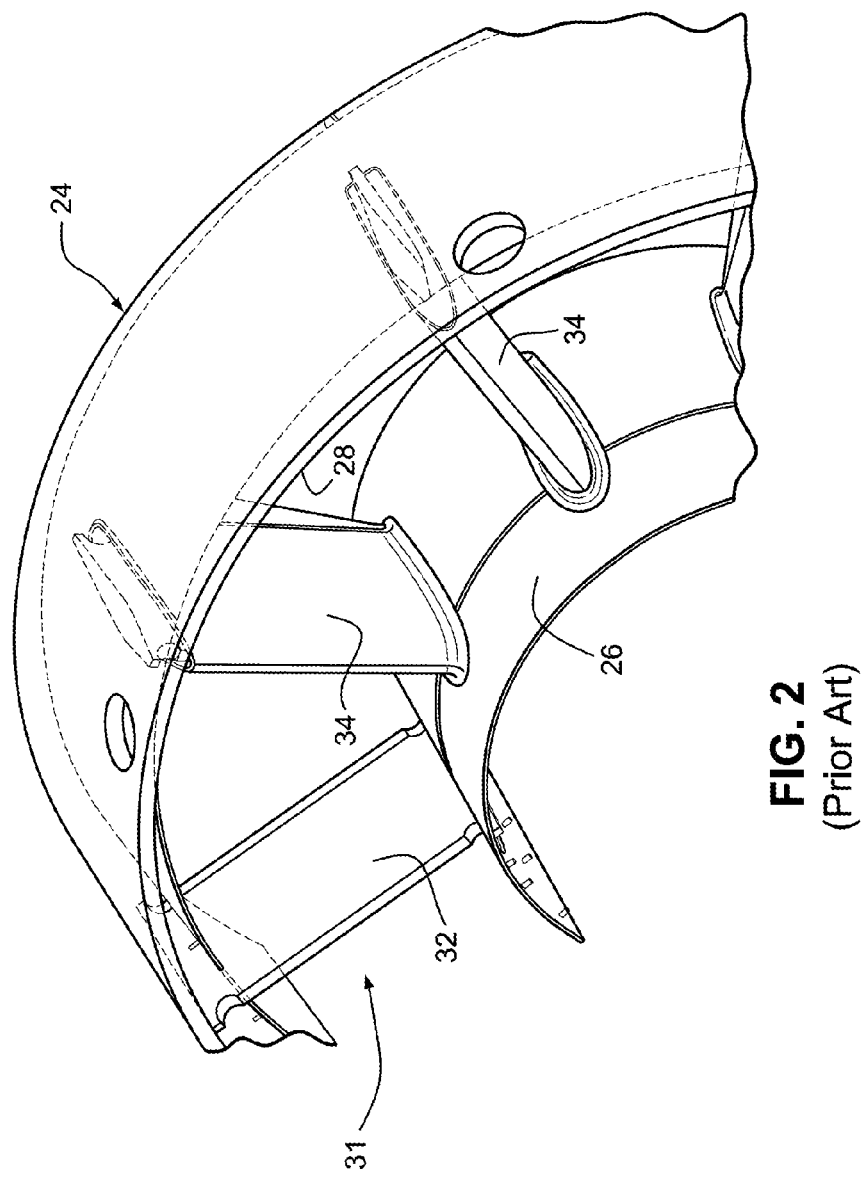
FIG. 2 is a partial perspective of a conventional gas turbine diffuser exhaust frame.

FIG. 2 enlarges the diffuser frame 24 so as to show a single circumferential row of strut/airfoil assemblies 31 extending between the inner wall 26 and the outer wall or casing 28.

Figure 4:
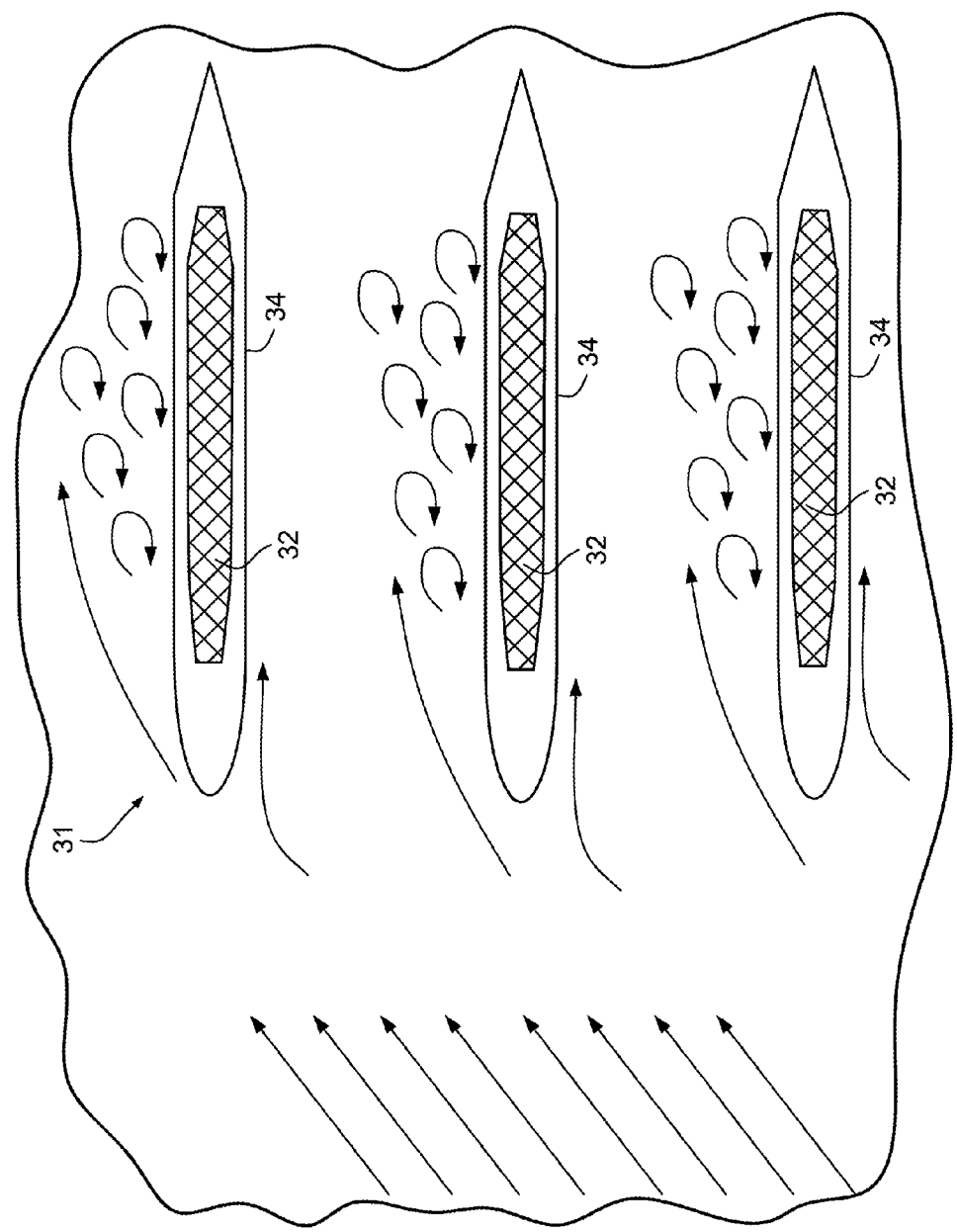
FIG. 4 is a schematic representation of exhaust gas flow entering an exhaust frame of the type shown in FIG. 2.

Typically, the strut or airfoil is constructed in two pieces including an internal structural strut component 32 (see also. FIG. 4) and an external airfoil component 34 wrapped about the internal strut. For convenience, the strut/airfoil assemblies will be referred to, simply, as airfoils. The internal struts are typically constructed of a material that is not rated for the high temperatures of the combustion gases flowing through the diffuser. The airfoils wrapped about the struts are designed to withstand such temperatures.

Figure 3:
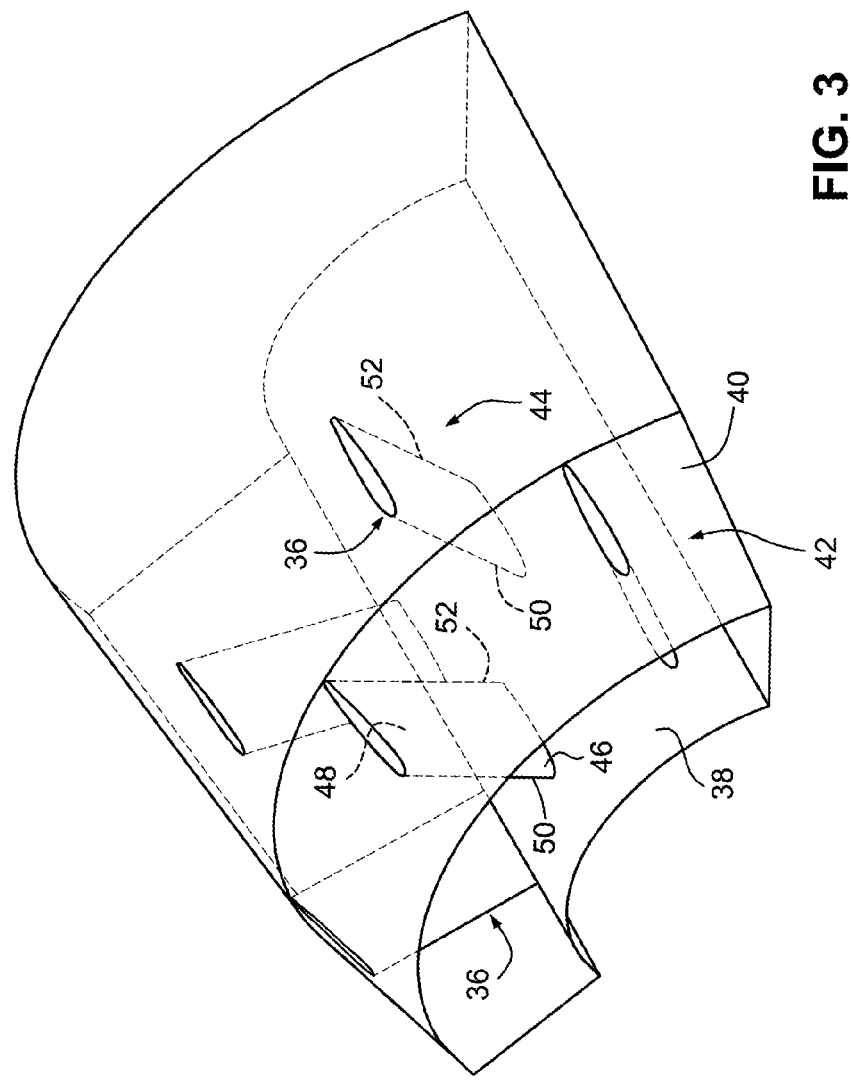
FIG. 3 is a partial perspective of a gas turbine diffuser exhaust frame in accordance with an exemplary but nonlimiting embodiment of the invention.

With reference to FIG. 3, in one exemplary but nonlimiting embodiment, radially-extending airfoils 36 are fixed between the inner wall 38 and the outer wall 40. More specifically, the airfoils 36 are arranged in two axially-spaced rows 42, 44, each row having plural airfoils at circumferentially-spaced locations about the flow channel 30. Each airfoil has a root end 46 attached to the inner wall 38 and a tip end 48 attached to the outer wall 40, and each airfoil has a leading edge 50 and a trailing edge 52.

Figure 5:
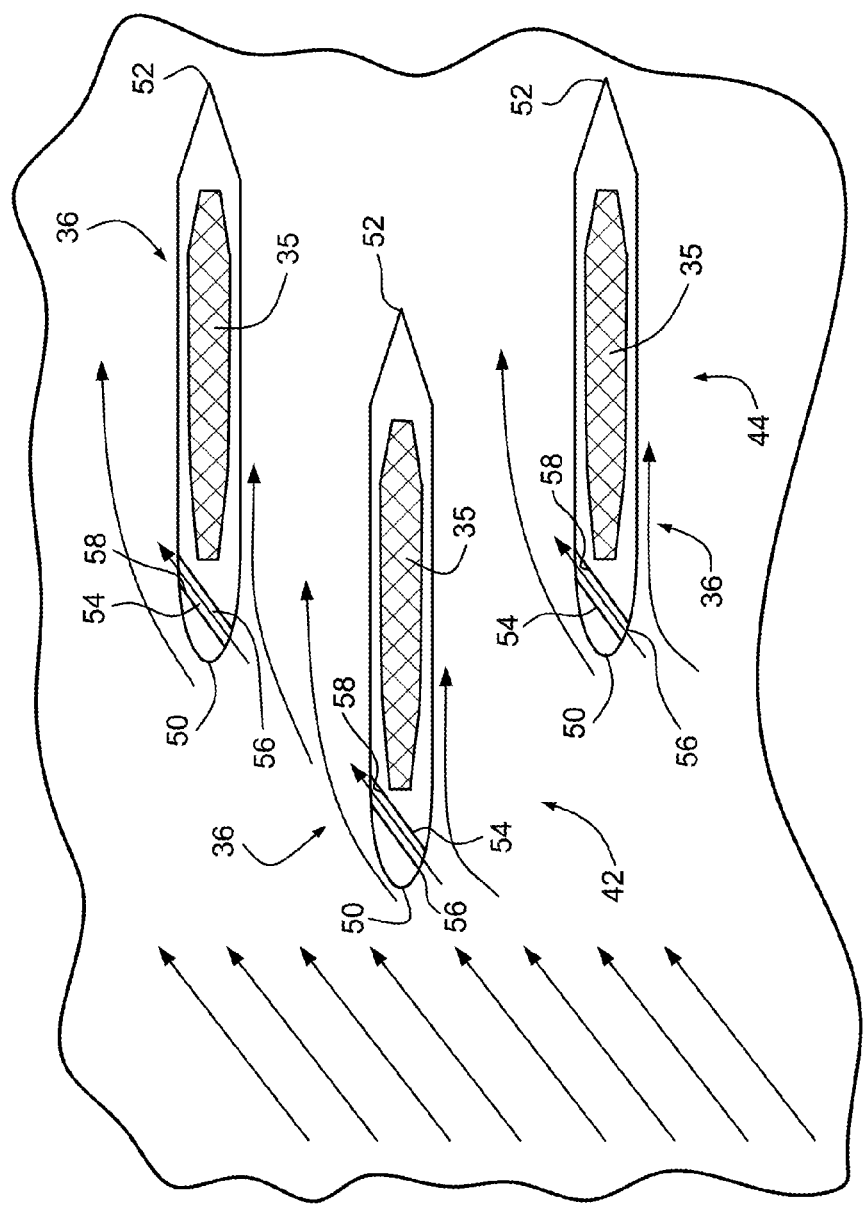
FIG. 5 is a schematic representation of exhaust gas flow entering an exhaust frame of the type shown in FIG. 3.

In the exemplary but nonlimiting embodiment, the first and second rows 42, 44 of airfoils 36 are staggered in the circumferential direction. In other words, in a circumferential direction, the airfoils are alternately located in the two respective rows. In the axial direction, the rows 42, 44 may be completely axially-spaced or partially overlapped as shown in FIGS. 3 and 5.

In the exemplary but nonlimiting embodiment, a 50% axial overlap has been shown to improve diffuser/exhaust frame performance but the degree of overlap may be tailored to provide optimum performance based on specific applications.

In this exemplary but nonlimiting configuration, one or more of the airfoils 36 in one or both of the two rows 42, 44 is provided with an elongated slot 54 adjacent the respective leading edge 50, and extending radially between the root end and the tip end. The radial height of the slot is variable, recognizing that adequate space must be maintained for securing the airfoils to the inner and outer walls. As best seen in FIG. 5, the slot 54 is angled internally within the airfoil 36 at an acute angle relative to a longitudinal center axis passing through the frame and thus through the inner cylindrical body 26. The slot 54 is angled in a downstream direction from the leading edge 50 toward the trailing edge 52, with an inlet 56 on one side of the airfoil extending adjacent the leading edge and an outlet 58 on the opposite side of the airfoil, closer to the trailing edge. The slot angle is variable but should substantially match the swirl angle of the exhaust gas approaching and/or impinging on the airfoils.

With this arrangement, total load coming onto the struts is divided on the two rows 42, 44 of airfoils 36. This permits each internal strut to have a smaller cross-section than in the prior single-row design. Specifically, the arrangement permits both a smaller axial length and a smaller width for the internal struts 35 (FIG. 5) and airfoils 36 in each row which, in turn, produces reduced performance losses at part-load operation. Compared to prior designs, the width of each strut/airfoil assembly can be reduced by up to about 50%, and the length can be reduced by up to about 40%. The smaller airfoil cross-sections enabled by the two-row arrangement also facilitate the incorporation of the slots 54 by not posing any structural concerns for the airfoils. In addition, the two-row design improves the stiffness/rigidity of the exhaust frame/diffuser itself, while promoting more uniform thermal growth.

As best seen in FIG. 3, and as noted above, the angle of slots 54 is designed to substantially match the swirl angle of exhaust gases within the frame. This arrangement smoothes out the flow of gas as the gas transitions from swirling to axial flow, thus improving performance, especially in part-load conditions.

FIGS. 4 and 5 provide a flow comparison between the conventional single row of airfoils versus the staggered double-row arrangement described herein. In FIG. 4, it can be seen that considerable turbulence is created along one side of the single-row 31 of non-slotted airfoils 34. FIG. 5 on the other hand, illustrates a two-row configuration where all of the airfoils 36 in both rows 42, 44 are slotted (at 54), producing a smoother flow across the airfoils 34. Note also in this regard that the two-row arrangement, with reduced-width airfoils, provides less flow blockage at any given axial plane.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas turbine exhaust frame an inner substantially cylindrical wall;
   an inner wall which is substantially circular in cross section;
   an outer wall which is substantially circular in cross section and the outer wall tapers radially outwardly along a direction of exhaust gas flow from a gas turbine;
   an annular exhaust gas flow path defined between the inner wall and outer wall, and
   a plurality of airfoils extending radially between said inner wall and said outer wall, said plurality of airfoils arranged in first and second axially-spaced, circumferentially-staggered rows,
   wherein the airfoils in said second axially-spaced, circumferentially-staggered row at least partially overlap in an axial direction of the exhaust frame with airfoils in said first axially-spaced, circumferentially-staggered row,
   wherein each of said plurality of airfoils comprises an airfoil portion including a leading edge and a trailing edge; a root end attached to the inner wall and a tip end attached to the outer wall, and
   wherein one or more of said airfoils is provided with a radially-extending slot having an inlet along and adjacent at least a portion of said leading edge on one side of said airfoil.

2. The gas turbine exhaust frame according to claim 1 wherein the one or more of said airfoils provided with the radially-extending slot is in the front row.

3. The gas turbine exhaust frame according to claim 1 wherein the one or more of said airfoils provided with the radially-extending slot are in the first and second rows.

4. The gas turbine exhaust frame according to claim 1 wherein said radially-extending slot has an outlet on an opposite side of said airfoil closer to said trailing edge.

5. A gas turbine exhaust diffuser comprising:
   a frame having an inner wall and an outer wall defining an annular exhaust gas flow channel, wherein the inner wall and outer wall are each substantially circular in cross section; and
   a plurality of airfoils extending between said inner and outer walls, said plurality of airfoils arranged in first and second axially-spaced, circumferentially-staggered rows, wherein said first and second axially-spaced, circumferentially-staggered rows at least partially overlap in an axial direction,
   wherein one or more of said airfoils is provided with a slot having an inlet extending radially along and adjacent at least a portion of a leading edge of one side of said one or more airfoils.

6. The gas turbine exhaust diffuser according to claim 5 wherein each of said airfoils in said first row is provided with a slot having an inlet extending radially along and adjacent at least a portion of said leading edge on one side of said airfoil.

7. The gas turbine exhaust diffuser according to claim 5 wherein each of said airfoils in said first and second rows is provided with a slot having an inlet extending radially along and adjacent at least a portion of a respective leading edge.

8. The gas turbine exhaust diffuser according to claim 7 wherein each slot is oriented at an acute angle relative to a longitudinal center axis of said inner wall, and extends from an inlet on one side of said airfoil to an outlet on an opposite side of said airfoil.

9. The gas turbine exhaust diffuser of claim 8 wherein said first and second axially-spaced, circumferentially-staggered rows overlap by about 50%.

10. A gas turbine exhaust diffuser comprising:
a frame having an inner wall and an outer wall defining an annular exhaust gas flow channel, wherein the inner wall and outer walls each have substantially circular cross sections;
a plurality of airfoils extending between said inner and outer walls, said plurality of airfoils arranged in first and second annular, axially-spaced, and circumferentially-staggered rows;
each of said plurality of airfoils having a leading edge and a trailing edge and a slot extending radially along and adjacent at least a portion of said leading edge, said slot having an inlet on one side of said airfoil extending angularly in a downstream direction to an outlet on an opposite side of said airfoil.

11. The gas turbine exhaust diffuser according to claim 10 wherein each slot is angled to substantially match a swirl angle of gas flow entering the diffuser.

12. The gas turbine exhaust diffuser according to claim 11 wherein each slot is oriented at an acute angle relative to a longitudinal center axis of said inner wall.

13. The gas turbine exhaust diffuser according to claim 11 said first and second axially-spaced, circumferentially-staggered rows at least partially overlap in an axial direction.

14. The gas turbine exhaust diffuser according to claim 13 wherein said first and second axially-spaced, circumferentially-staggered rows overlap in said axial direction by about 50%.

* * * * *